(12) United States Patent
Moskow et al.

(10) Patent No.: US 10,050,938 B2
(45) Date of Patent: Aug. 14, 2018

(54) HIGHLY SECURE FIREWALL SYSTEM

(71) Applicants: Jeffrey H. Moskow, Lansing, NY (US); Theodore J. Stefanik, Harvard, MA (US)

(72) Inventors: Jeffrey H. Moskow, Lansing, NY (US); Theodore J. Stefanik, Harvard, MA (US)

( * ) Notice: Subject to any disclaimer, the term of this patent is extended or adjusted under 35 U.S.C. 154(b) by 0 days.

(21) Appl. No.: 14/927,148

(22) Filed: Oct. 29, 2015

(65) Prior Publication Data
US 2016/0127316 A1 May 5, 2016

Related U.S. Application Data

(60) Provisional application No. 62/073,720, filed on Oct. 31, 2014.

(51) Int. Cl.
*H04L 29/06* (2006.01)

(52) U.S. Cl.
CPC ........ *H04L 63/0263* (2013.01); *H04L 63/029* (2013.01); *H04L 63/0218* (2013.01)

(58) Field of Classification Search
CPC ............. H04L 63/0218; H04L 63/0263; H04L 63/029
See application file for complete search history.

(56) References Cited

U.S. PATENT DOCUMENTS

| | | | |
|---|---|---|---|
| 6,405,318 B1 * | 6/2002 | Rowland | G06F 21/552 726/22 |
| 6,708,187 B1 * | 3/2004 | Shanumgam | H04L 41/0233 |
| 2005/0094637 A1 * | 5/2005 | Umesawa | H04L 41/0893 370/389 |
| 2005/0182945 A1 * | 8/2005 | Ali | G06F 21/31 713/182 |
| 2011/0145910 A1 * | 6/2011 | Barnes | H04L 63/0263 726/12 |
| 2015/0113518 A1 * | 4/2015 | Liem | G06F 21/57 717/171 |

OTHER PUBLICATIONS

M. Doyle, "Implementing a port knocking system in C", Honor Thesis in Physics, The University of Arkansas, 2004.*
V. Srivastava et al. "Advanced Port Knocking Authentication Scheme with QRC using AES," ETNCC 2011.*
M. Krzywinski, "Port Knocking: flexible security through authentication across closed ports," WCSF 2003, Nov. 17, 2003.*
R. deGraaf, et al. "Improved port knocking with strong authentication," Computer Security Applications Conference, 21st Annual, Dec. 2005.*
M. Krywinski, "Port Knocking—Network Authentication Across Closed Ports," Sys Admin, vol. 12, No. 6, Jun. 2003, pp. 12-17.*

* cited by examiner

*Primary Examiner* — Robert B Leung
(74) *Attorney, Agent, or Firm* — Absolute Technology Law Group, LLC; Jill Welytok

(57) ABSTRACT

A firewall system with closed ports configured to reject the data packets and create a readable log of rejected data packets. A port listening processor utilizes multiple daemon processors to receive and process information from the data packets to open ports using the dynamically modifiable port specific data structures.

18 Claims, 3 Drawing Sheets

| File | Global | User | Permission | Role |

▽ Groups
    everyone
▽ Users
    jeff
    louise
    mgreene
▽ Roles
    developer
    tech support
    vpn user
▽ Permissions             Right click for menus
    CheckMK
    FTP
    OTRS
    OpenVPN
    PPTP
    Remote Desktop
    SSH
    VNC
▽ Globals
    all_at_once
    firewall_type
    ip_lockout
    ip_lockout_window
    knock_ports
    knock_types
    maximum_clock_skew
    rsa_private_key
    rsa_public_key
    url_base
    url_name
    url_per_user
    user_lockout
    user_lockout_window Process Permissions

Figure 2a

✗ Permission Details

Name: SSH

Ports: 22, 26

Protocol:
- ☐ GRE
- ☐ ICMP
- ☑ TCP
- ☐ UDP

Internal IP Address: 172.16.156.251

Public IP Address:

Disabled: ☐

[Cancel]  [Save]

Figure 2b

HIGHLY SECURE FIREWALL SYSTEM

CROSS-REFERENCE TO RELATED APPLICATIONS

This application claims priority to U.S. application Ser. No. 62/073,720 filed on Oct. 31, 2014, which is hereby incorporated by reference in its entirety.

BACKGROUND

1. Field of Invention

This invention relates to the field of information security, and more specifically to network firewall security protocols.

2. Description of the Related Art

Increasingly, software components perform functions previously provided by hardware components. At a basic level, a firewall performs processing functions which enable authorized messages (i.e., data) to be transferred back and forth between systems in an efficient and secure manner. In theory, unauthorized users will not be able to access and communicate with computers on the protected network.

Typical firewalls known in the art require a trained network administrator to configure a firewall by creating a list of "ports." A port is code which operates as set of interface instructions for other computers to connect to the network. The code that comprises a port is written to accept authorized communication packets, and to direct the packets based on the information in the header.

Most firewalls ports allow packets generated by external computers to pass connections when the communications conform to specific types of services (e.g. HTTP/HTTPS/Web, DNS, NTP, SMTP/IMAP/IMAPS/POP, RDP, SSH, etc). Currently, skilled administrators configure the ports to recognize packet information providing credentials from a select group of users, allowing them to access services that the users are permitted to access. A port that accepts incoming packets is referred to as an "open" port.

One of the most significant problems known in the art of network security is the vulnerability of "open" ports to malicious code that emulates authentic code or which bombards the ports with communications that impede the firewall from the orderly processing of communications packets. Malicious code can also enter a firewall and disable the device itself.

Currently, firewalls known in the art do not prevent hackers from both brute force attacks (trying to guess credentials) and from exploiting known deficiencies. As mobile computing becomes widespread this problem is exacerbated. Users in mobile networks attach their computers to untrusted public networks (e.g., via public WiFi). In mobile networks, firewall exceptions (e.g., allow and do-not-allow policies) for services and applications that are enabled on the user's home networks (e.g., file sharing) may remain enabled when these users connect to unprotected public networks (such as a coffee shop or airport WiFi).

Attempts have been made in the art to develop technologies which can enable firewalls to receive necessary information packets from external computers without the need to leave ports open to "listen" for communications. "Port knocking" is one technology known in the art which has been developed to limit the vulnerability of open ports. In theory, port knocking allows all ports in a firewall to be closed until connection attempts are made on closed parts is a specific sequence. The connection attempts operate like the coded sequence of a combination lock because each port has a number associated with it. Accessing the correct port numbers in the correct sequence opens the firewall ports.

The primary purpose of port knocking is to prevent an attacker from scanning a system for potentially exploitable services by doing a port scan, because unless the attacker sends the correct knock sequence, the protected ports will appear closed.

Despite the promise of port knocking technology as a means of securing firewalls against brute force and denial of service attacks, there are significant obstacles for implementing this technology to create viable security options in a business. In particular, firewalls must be deployed across a wide range of network platforms.

There is an unmet need for standardized, easily deployed firewall technology that can be made commercially available at a reasonable cost and effectively deployed regardless of the network protocol utilized by particular devices or networks in communication through the firewall.

There is an unmet need for a firewall that is capable of responding to changes in a network environment to dynamically modify firewall exceptions as needed within the particular environment.

There is a further unmet need for a firewall that can receive user-generated messages in packets without the need to first "open" the firewall to receive the packets.

SUMMARY OF THE INVENTION

A distributed firewall system includes at least one client computer, at least one firewall barrier device and at least one port listening processor. The client computer is capable of sending a plurality of data packets to at least one firewall barrier device for possible routing to at least one protected computer. In the embodiment shown, the firewall barrier device has a plurality of closed ports configured to reject data packets with or without message acknowledgement to the client computer. These are commonly referred to as "rejected packets" or "dropped packets." In alternative embodiments, the firewall barrier device is configured with at least one readable log of data packets rejected by the firewall barrier device. The firewall barrier device is further configured with a dynamically modifiable firewall rule set comprised of dynamically modifiable port specific data structures for transforming port status for authenticated users.

The port listening processor is connected with the firewall barrier device and includes a first daemon processor and a second daemon processor. The first daemon processor performs a plurality of first daemon processes configured to monitor the readable log, extract a series of universal data values from the plurality of data packets and assemble an encrypted message from the series of universal data values. The second daemon processor performs a plurality of second daemon processes configured to transform the encrypted message into a decrypted message, authenticate the decrypted message using user authentication data and update the dynamically modifiable port specific data structures based on data contained in the decrypted message.

BRIEF DESCRIPTION OF THE DRAWINGS

FIGS. 2a and 2b illustrate exemplary screens of an administrator interface for the distributed firewall system.

TERMS OF ART

Figure 1:
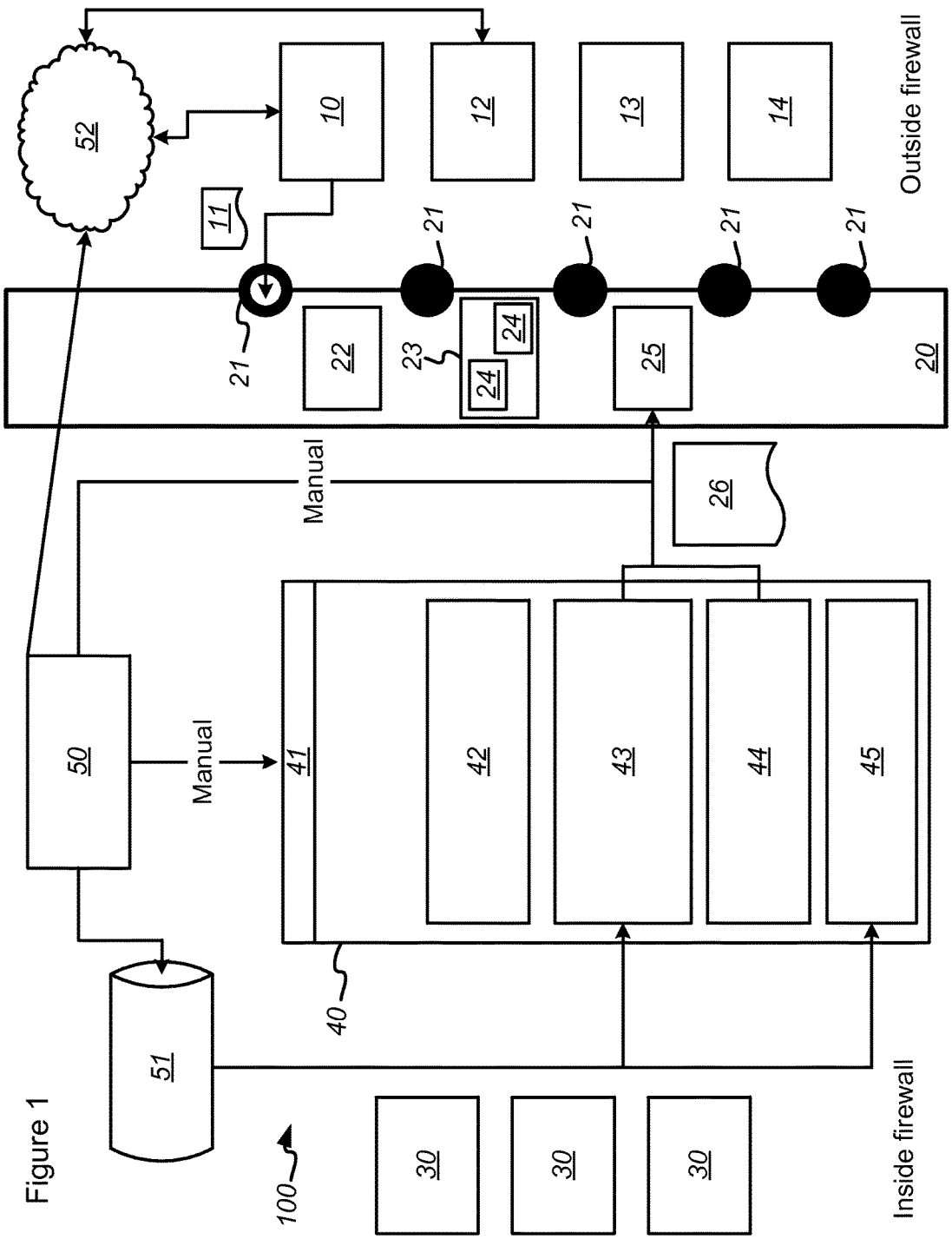
FIG. 1 illustrates a schematic of a distributed firewall system.

As used herein, the term "dropped packet" means a packet that is discarded without acknowledgment to the sender and/or without processing of the contents of the packet. The packet may or may not be logged.

As used herein, the term "dynamically modifiable" means non-static and reflecting a modifiable computer state.

As used herein, the term "rejected packet" means a packet that is discarded with acknowledgment to the sender and/or without processing of the contents of the packet. The packet may or may not be logged.

As used herein, the term "real time" means occurring during a single user connection session.

DETAILED DESCRIPTION OF INVENTION

FIG. 1 illustrates a schematic of a distributed firewall system 100. Distributed firewall system 100 includes at least one client computer 10, at least one firewall barrier device 20, at least one protected computer 30, a port listening processor 40 and an optional administrative server 50.

Client computer 10 is configured with packet software to allow an authorized user to create a plurality of data packets 11. Client computer 10 is capable of sending this plurality of data packets 11 to firewall barrier device 20. If data packets 11 are a valid knock sequence containing valid authentication data, then one or more ports within a plurality of ports 21 will be opened to allow access to a user according to permissions with the sender of the packets.

Firewall barrier device 20 prevents data packets 11 from other computers, such as an unauthenticated client computer 12, an unknown computer 13 or an attacking computer 14 from routing to protected computer 30.

Firewall barrier device 20 includes ports 21, a readable log 22, a dynamically modifiable firewall rule set 23 and a static configuration interface 25. Firewall barrier device 20 rejects data packets 11 with or without message acknowledgement to client computer 10. Readable log 22, a contemporaneously generated record of dropped and rejected data packets 11, monitors these dropped and rejected data packets 11. In one embodiment, readable log 22 is a stored data file. In another embodiment, readable log 22 is a real-time data file and is not stored. In another embodiment, readable log 22 is capable of supporting data extraction protocols.

Dynamically modifiable firewall rule set 23 is made up of dynamically modifiable port specific data structures 24 for transforming the status of ports 21 from open to closed for authenticated users. In one embodiment, dynamically modifiable firewall rule set 23 is based on at least one dynamically modifiable rule set data file. In another embodiment, the dynamically modifiable port specific data structures 24 contain data. Such data may be selected from a group including user authentication parameters, authorization parameters, hardware specific value parameters, password data, user credential data, location values, time values and time parameters. In another embodiment, the dynamically modifiable port specific data structures 24 contain data and executable commands, such as policy modification requests.

Static configuration interface 25 receives platform specific commands 26 from port listening processor 40 and/or administrative server 50. Platform specific commands 26 modify static configuration interface 25 to update policies and parameters for firewall barrier device 20.

Port listening processor 40 is connected to firewall barrier device 30. In one embodiment, port listening processor 40 is located externally to firewall barrier device 20 as a separate component. In another embodiment, port listening processor 40 is an integral part of firewall barrier device 20. Port listening processing 40 includes a static modification GUI 41, a first daemon processor 42, a second daemon processor 43, an optional third daemon processor 44 and an optional fourth daemon processor 45.

Static modification GUI 41 provides an interface between port listening processor 40 and optional administrative server 50. This allows optional administrative server 50 to make manual changes to port listening processor 40.

First daemon processor 42 is configured with software to perform a plurality of first daemon processes configured to monitor readable log 22, extract a series of universal data values from data packets 11 and assemble an encrypted message from the series of universal data values. In one embodiment, the encrypted message invokes a function to send a communication to a system administrator or to client computer 10.

Second daemon processor 43 is configured with software to perform a plurality of second daemon processes configured to transform the encrypted message into a decrypted message, authenticate the decrypted message using user authentication data and update dynamically modifiable port specific data structures 24 based on data contained in the decrypted message. In one embodiment, the decrypted message is platform independent and can be processed by firewall barrier device 20.

Optional third daemon processor 44 is configured with software to perform a plurality of third daemon processes configured to delete old data and transform the status of ports 21 from closed to open using platform-specific codes as needed. Optional fourth daemon processor 45 is also configured with software to perform a plurality of fourth daemon processes configured to administrate policy and parameter changes.

Administrative server 50 includes administrator interface 51 and a platform independent client computer interface 52.

Administrator interface 51 allows modification of user authentication data and at least one user policy. User authentication data is selected from a group including hardware specific data, password data, user identification data, user credential data, location parameter data, a time stamp, machine identification data and user group.

In various embodiments, platform independent client computer interface 52 may be web-based JavaScript that executes locally on the client computer. Administrative server 50 updates platform independent client computer interface 52. In one embodiment, administrative server 50 provides, via platform independent client computer interface 52, a platform independent executable data structure to configure client computer 10 to generate data packets 11.

FIGS. 2a and 2b illustrate exemplary screens of administrator interface 51 for distributed firewall system 100.

FIG. 2a illustrates an exemplary screen used by an administrator to configure distributed firewall system 100. In the embodiment shown, an administrator may add or specify permissions for groups, users to be added to groups. Additionally, an administrator can grant multiple permissions associated with a particular role to which a user is associated. A role is a group of permissions. In the embodiment shown, an administrator may also specify the ports 21 and protocols which are permitted to connect.

In various embodiments, the administrator may specify the specific internal ports 21 (and computers) to which a user may connect on the on a network, and which users may connect externally internally or externally FIG. 2b illustrates another exemplary screen used by an administrator to configure a rule permission for configuring distributed firewall system 100. A rule permission is a description of what rules associated with that permission will allow. For example, in the embodiment shown an administrator may allow a user to connect clients on ports 22 or 26 and to direct the user an internal IP address 172.16.156.251.

It will be understood that many additional changes in the details, materials, procedures and arrangement of parts, which have been herein described and illustrated to explain the nature of the invention, may be made by those skilled in the art within the principle and scope of the invention as expressed in the appended claims. It should be further understood that the drawings are not necessarily to scale; instead, emphasis has been placed upon illustrating the principles of the invention.

What is claimed is:

1. A platform independent port-knocking firewall barrier device with multi-factor authentication comprised of:
   at least one firewall component that is a firewall computer having memory and a processor;
      wherein said memory stores port numbers and rule sets associated with ports;
      and wherein said processor is configured to dynamically modify firewall rule sets comprised of dynamically modifiable port specific data structures for transforming port status for authenticated users associated with a plurality of ports;
   a plurality of client computer components which include memory and a client request processor,
      wherein said client request processor operatively couples said firewall computer to said client computer, creating a sequence of data packets;
      wherein said firewall computer has a plurality of closed ports configured to reject said sequence of data packets with or without message acknowledgement to said client computer;
      wherein said firewall computer is configured with at least one readable log of data packets rejected by said firewall computer;
      wherein each of said client request processors is configured with JavaScript to transmit said sequence of data packets to said firewall computer by a web-based interface;
      wherein said each data packet within said sequence of data packets includes:
         machine identification data to identify a specific computer;
         an authenticating time stamp value,
         one port number within a dynamically modifiable range of port numbers corresponding to all currently available ports associated with a service on a network, and wherein each port number in said dynamically modifiable range is available as a value used for forming encrypted messages,
         wherein said sequence of data packets is recorded in said readable log,
      wherein said sequence of data packets further includes:
         a first data packet within said sequence of data packets; and
         subsequent data packets within said sequence which include a value that is a port number;
   at least one port listening processor operatively coupled to said at least one firewall component, wherein said port listening processor is comprised of:
      a first daemon processor which monitors said readable log, extract a series of universal data values from data packets rejected in said readable log and assemble an encrypted message from the series of universal data values;
      and
      at least one request to modify a firewall configuration; and
      a second daemon processor configured with software to perform a plurality of second daemon processes configured to transform said encrypted message into a decrypted message;
      wherein said second daemon processor authenticates the decrypted message using user authentication data to dynamically modify one or more firewall rule sets for one or more ports using said one or more types of encrypted authentication data.

2. The firewall barrier device of claim 1, further comprising an administrative server having an administrator interface for modifying said user authentication data and at least one user policy.

3. The firewall barrier device of claim 2, wherein said administrative server further comprises a platform independent client computer interface, wherein said administrative server is configured to update said platform independent client computer interface.

4. The firewall barrier device of claim 2 wherein said user authentication data is selected from the group consisting of: hardware specific data, password data, user identification data, user credential data, location parameter data, a time stamp, machine identification data and user group.

5. The firewall barrier device of claim 2 wherein said administrative server further comprises at least one platform independent executable data structure to configure said client computer to generate said plurality of data packets.

6. The firewall barrier device of claim 1 wherein said decrypted message is platform independent and can be processed by said firewall barrier device.

7. The firewall barrier device of claim 1 wherein said at least one client computer is configured with packet software to allow an authorized user to create said plurality of data packets.

8. The firewall barrier device of claim 1 wherein said dynamically modifiable firewall rule set is based on at least one dynamically modifiable rule set data file.

9. The firewall barrier device of claim 1 wherein said port listening processor is located externally to said firewall barrier device as a separate component.

10. The firewall barrier device of claim 1 wherein said port listening processor is an integral part of said firewall device.

11. The firewall barrier device of claim 1 wherein said readable log is a stored data file.

12. The firewall barrier device of claim 1 wherein said readable log is capable of supporting data extraction protocols.

13. The firewall barrier device of claim 1 wherein said dynamically modifiable port specific data structures contain data.

14. The firewall barrier device of claim 13 wherein said data is selected from the group consisting of: user authentication parameters, authorization parameters, hardware specific value parameters, password data, user credential data, location values, time values and time parameters.

15. The firewall barrier device of claim 1 wherein said data structures contain data and executable commands.

16. The firewall barrier device of claim 15 wherein said dynamically modifiable port specific data structures contain policy modification requests.

17. The firewall barrier device of claim 1 wherein said encrypted message invokes a function to send a communication to a system administrator.

18. The firewall barrier device of claim 1 wherein said encrypted message invokes a function to send a communication to said client computer.

* * * * *